(12) United States Patent
Clawsie et al.

(10) Patent No.: US 11,064,035 B2
(45) Date of Patent: Jul. 13, 2021

(54) COORDINATING THE USE OF INDEPENDENT RADIO RECEIVERS ASSOCIATED WITH A SINGLE TRANSMITTER

(71) Applicant: INTERNATIONAL BUSINESS MACHINES CORPORATION, Armonk, NY (US)

(72) Inventors: Brad J. Clawsie, Los Gatos, CA (US); Glen C. Darling, San Jose, CA (US); Isaac F. Leonard, Veneta, OR (US); Dmitry A. Rekesh, Pleasanton, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/692,393

(22) Filed: Nov. 22, 2019

(65) Prior Publication Data

US 2020/0092383 A1    Mar. 19, 2020

Related U.S. Application Data

(63) Continuation of application No. 15/165,324, filed on May 26, 2016, now Pat. No. 10,587,699.

(51) Int. Cl.
*H04L 29/08* (2006.01)
*H04W 48/16* (2009.01)
(Continued)

(52) U.S. Cl.
CPC ............ *H04L 67/16* (2013.01); *G06Q 30/00* (2013.01); *H04W 48/16* (2013.01); *H04B 1/0003* (2013.01); *H04W 88/06* (2013.01)

(58) Field of Classification Search
None
See application file for complete search history.

(56) References Cited

U.S. PATENT DOCUMENTS 5,715,516 A * 2/1998 Howard ............... H04B 7/0491
455/422.1
6,671,273 B1 * 12/2003 Beck ...................... H04L 29/06
370/351

(Continued)

FOREIGN PATENT DOCUMENTS

| WO | 2008023356 A2 | 2/2008 |
| WO | 2013143105 A1 | 10/2013 |

OTHER PUBLICATIONS

Mell et al., "The NIST Definition of Cloud Computing", NIST, Special Publication 800-145, Sep. 2011, 7 pages.
(Continued)

*Primary Examiner* — Ayaz R Sheikh
*Assistant Examiner* — Faiyazkhan Ghafoerkhan
(74) *Attorney, Agent, or Firm* — Daniel Yeates; Andrew D. Wright; Roberts Calderon Safran & Cole, P.C.

(57) ABSTRACT

A computer-implemented method comprises discovering, by a client device, an available host computing device implementing a radio receiver, wherein the host computing device is identified from a decentralized shared database; establishing, by the client device, a relationship with the host computing device based on discovering the host computing device from the decentralized shared database; receiving, by the client device, application data from the host computing device based on establishing the relationship, wherein the application data is associated with radio signals received by the radio receiver from a single transmitter; and storing, outputting, or displaying, by the client device, the application data.

10 Claims, 9 Drawing Sheets

(51) Int. Cl.
*G06Q 30/00* (2012.01)
*H04B 1/00* (2006.01)
*H04W 88/06* (2009.01)

(56) References Cited

U.S. PATENT DOCUMENTS

| | | | | |
|---|---|---|---|---|
| 7,296,091 | B1* | 11/2007 | Dutta | H04H 20/42 370/331 |
| 7,373,152 | B2* | 5/2008 | Oesterling | H04B 17/20 455/404.2 |
| 8,295,153 | B2* | 10/2012 | Nentwig | H04L 1/0003 370/204 |
| 9,237,074 | B1* | 1/2016 | Sampath | H04L 41/044 |
| 9,893,774 | B2* | 2/2018 | Shattil | H04J 11/003 |
| 10,375,561 | B2* | 8/2019 | Clawsie | H04W 4/029 |
| 10,587,699 | B2* | 3/2020 | Clawsie | H04W 48/16 |
| 10,735,938 | B2* | 8/2020 | Clawsie | H04W 4/029 |
| 2004/0254887 | A1* | 12/2004 | Jacoby | H04N 21/2402 705/52 |
| 2006/0286937 | A1* | 12/2006 | Russell | H04W 48/16 455/67.11 |
| 2006/0287001 | A1* | 12/2006 | Budampati | H04B 1/0003 455/552.1 |
| 2009/0164665 | A1* | 6/2009 | Foote | H04L 61/1511 709/245 |
| 2009/0190677 | A1* | 7/2009 | Jokela | H04L 5/0053 375/260 |
| 2010/0304770 | A1* | 12/2010 | Wietfeldt | H04W 72/1215 455/509 |
| 2011/0244892 | A1* | 10/2011 | MacManus | H04W 4/02 455/457 |
| 2012/0108266 | A1* | 5/2012 | Clark | H04W 4/029 455/456.3 |
| 2012/0231826 | A1* | 9/2012 | Koorapaty | H04W 24/02 455/509 |
| 2013/0295934 | A1* | 11/2013 | Reagan | H04W 24/02 455/436 |
| 2014/0081815 | A1* | 3/2014 | Miller | G06Q 30/04 705/34 |
| 2014/0221005 | A1* | 8/2014 | Marshall | G01S 5/0273 455/456.1 |
| 2014/0307701 | A1* | 10/2014 | Markwart | H04W 72/0493 370/329 |
| 2014/0357234 | A1* | 12/2014 | Sullivan | H04L 67/10 455/412.1 |
| 2014/0378123 | A1* | 12/2014 | Stojanovski | H04L 5/0035 455/422.1 |
| 2015/0058728 | A1* | 2/2015 | Haggerty | G06F 3/165 715/716 |
| 2015/0082382 | A1* | 3/2015 | Maguire | H04L 69/18 726/3 |
| 2015/0149403 | A1* | 5/2015 | Sullivan | H04W 4/06 707/603 |
| 2015/0319573 | A1* | 11/2015 | Huang | H04W 4/021 455/456.1 |
| 2015/0358767 | A1* | 12/2015 | Luna | H04W 4/029 455/456.1 |
| 2016/0006837 | A1* | 1/2016 | Reynolds | H04W 84/18 709/203 |
| 2016/0259923 | A1* | 9/2016 | Papa | H04W 12/08 |
| 2016/0342989 | A1* | 11/2016 | Davis | G06Q 20/3674 |
| 2017/0031676 | A1* | 2/2017 | Cecchetti | H04L 9/3236 |
| 2017/0031874 | A1* | 2/2017 | Boudville | G06Q 10/063 |
| 2017/0046652 | A1* | 2/2017 | Haldenby | H04L 9/0816 |
| 2017/0046664 | A1* | 2/2017 | Haldenby | G06F 21/62 |
| 2017/0076306 | A1* | 3/2017 | Snider | H04W 4/029 |
| 2017/0118301 | A1* | 4/2017 | Kouru | H04L 67/06 |
| 2017/0142676 | A1* | 5/2017 | Iovanna | H04W 56/0015 |
| 2017/0195388 | A1* | 7/2017 | Chaudhri | G06F 3/0482 |
| 2017/0200137 | A1* | 7/2017 | Vilmont | G06Q 30/0213 |
| 2017/0221029 | A1* | 8/2017 | Lund | H04W 12/04 |
| 2017/0279774 | A1* | 9/2017 | Booz | G06Q 20/123 |
| 2017/0324491 | A1* | 11/2017 | Littlejohn | G06Q 30/0271 |
| 2017/0330179 | A1* | 11/2017 | Song | G06Q 20/065 |
| 2017/0346907 | A1* | 11/2017 | Clawsie | H04W 48/16 |
| 2017/0347253 | A1* | 11/2017 | Clawsie | H04W 4/029 |
| 2017/0353354 | A1* | 12/2017 | Karapantelakis | H04L 67/104 |
| 2018/0020324 | A1* | 1/2018 | Beauford | H04L 43/10 |
| 2018/0083724 | A1* | 3/2018 | Ingrassia | H04H 60/74 |
| 2018/0341372 | A1* | 11/2018 | Kahn | H04N 21/41407 |
| 2019/0073418 | A1* | 3/2019 | van der Heide | G06F 16/60 |
| 2019/0274028 | A1* | 9/2019 | Clawsie | H04W 4/02 |

OTHER PUBLICATIONS

Darling, "Blue Horizon: decentralized autonomous edge compute", https://bluehorizon.network; made available Apr. 28, 2016, 3 pages. Grace period disclosure under 35 USC §102(b)(1)(A).

List of IBM Patents or Patent Applications Treated as Related, dated Nov. 21, 2019, 1 page.

* cited by examiner

COORDINATING THE USE OF INDEPENDENT RADIO RECEIVERS ASSOCIATED WITH A SINGLE TRANSMITTER

BACKGROUND

The present invention generally relates to coordinating the use of unrelated radio receivers and, more particularly, to coordinating the use of unrelated radio receivers that receive radio signals from a single transmitter.

Radio receivers, such as software defined radios (SDRs) are radio communication systems in which components that have been typically implemented in hardware (e.g. mixers, filters, amplifiers, modulators/demodulators, detectors, etc.) are instead implemented by software on a personal computer or embedded system. A basic SDR system may include a computer device (e.g., a personal computer, miniature computer, mobile device, etc.) equipped with a sound card, or other analog-to-digital converter, preceded by some form of radio frequency (RF) front end. In an SDR system, significant amounts of signal processing are handed over to the general-purpose processor, rather than being done in special-purpose hardware (electronic circuits). Such a design produces a radio which can receive and transmit widely different radio protocols or frequencies (sometimes referred to as waveforms) based solely on the software used.

SDR receivers are used in applications in which a wide variety of changing radio protocols and frequencies are required in real time. SDR receivers are often individually owned and operated, and thus, coordinating the use of multiple different SDR receivers for various applications is complex, if at all possible.

SUMMARY

In an aspect of the invention, a computer-implemented method comprises discovering, by a client device, an available host computing device implementing a radio receiver, wherein the host computing device is identified from a decentralized shared database; establishing, by the client device, a relationship with the host computing device based on discovering the host computing device from the decentralized shared database; receiving, by the client device, application data from the host computing device based on establishing the relationship, wherein the application data is associated with radio signals received by the radio receiver from a single transmitter; and storing, outputting, or displaying, by the client device, the radio related data.

In an aspect of the invention, there is a computer program product for coordinating the use of independent and unrelated radio receivers. The computer program product comprises a computer readable storage medium having program instructions embodied therewith, the program instructions executable by a client device to cause the client device to: identify, from a decentralized shared database, an available host computing device implementing a radio receiver receiving radio signals from a single transmitter; provide a request to access the identified host computing device; receive an indication of acceptance of the request; provide information regarding an application code to the host computing device for execution on the host computing device based on receiving the indication of acceptance; receive radio related data from the host computing device based on providing the information regarding the application code to the host computing device, wherein the radio related data is associated with the radio signals received by the radio receiver from the single transmitter; and store, output, or display the radio related data.

In an aspect of the invention, a system comprises: a CPU, a computer readable memory and a computer readable storage medium associated with a host computing device implementing a radio receiver that receives radio signals from a single transmitter; program instructions to provide the availability of host computing device and the radio receiver of the host computing device to be used by a client device, wherein the availability is provided via a decentralized shared blockchain; program instructions to receive a request from the client device to access data associated with radio signals received by the radio receiver based on providing the availability of the host computing device; program instructions to receive information for obtaining an application code associated with the host computing device; program instructions to obtain the application code based on receiving the information for obtaining the application code; and program instructions to execute the application code, wherein executing the application code includes processing data associated with the radio signals received by the radio receiver and provide the processed data to the client device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
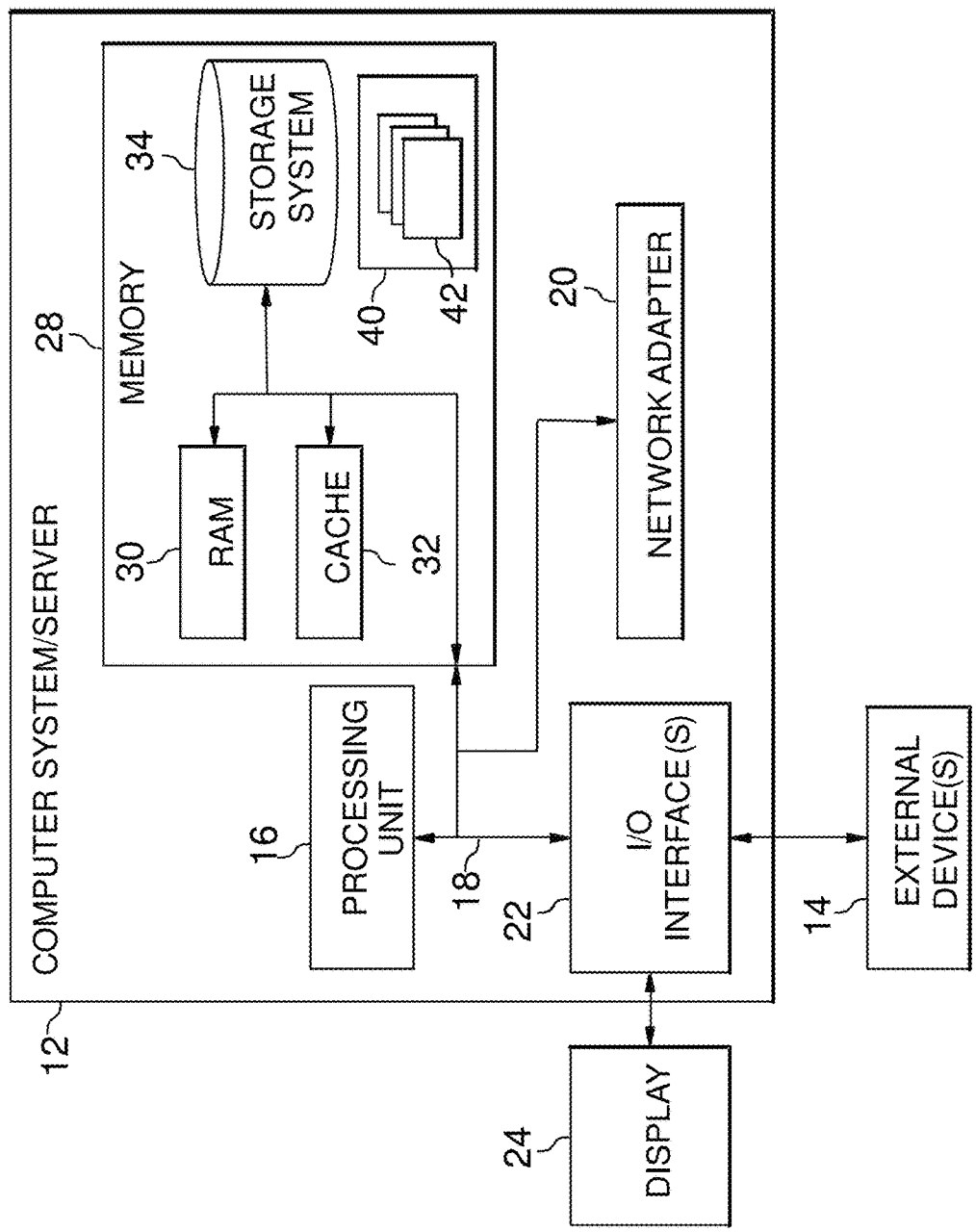
FIG. 1 depicts a cloud computing node according to an embodiment of the present invention.

The present invention generally relates to coordinating the use of unrelated radio receivers and, more particularly, to coordinating the use of unrelated radio receivers that receive radio signals from a single transmitter. As described herein, aspects of the present invention may include systems and/or methods to discover, negotiate, and contract with radio receivers in order to coordinate the use of unrelated radio receivers that receive radio signals from a single transmitter. In embodiments, the radio receivers may be implemented by host computing devices (e.g., portable computing devices, miniature computing devices, mobile computing devices, etc.). For example, a host computing device may include an integrated or external peripheral radio receiver. The radio receiver may include SDR receivers and/or other types of radio receiver.

In embodiments, independent and unrelated host computing devices each implementing independent and unrelated radio receivers may provide information indicating their respective availabilities to be contracted with and/or used for various applications. As described herein, a client device may contract with one or more host computing devices in order to utilize the radio receivers of the host computing devices. For example, a client device may contract with one or more host computing devices in order to implement an application using the radio receivers (e.g., a signal strength map application, a transmitter location identification application, a radio audio streaming application, and/or other type of application that uses radio receivers).

As described herein, a blockchain, peer-to-peer network, and/or similar technique may be used to provide host computing device information (e.g., information identifying the availability of host computing devices and their respective radio receivers to be contracted). That is, the providing of host computing device information may be decentralized, and the blockchain may be a decentralized shared database of host computing device information. A client device may discover a host computing device from the blockchain in order to establish a contracting relationship with the host computing device. As described herein, the blockchain may be used to facilitate the financial transaction between the client device and the host computing device in connection with the client device contracting with the host computing device for use of the radio receiver. Advantageously, the use of scattered, unrelated, and independent radio receivers can be coordinated for various applications, such as radio spectrum analysis (e.g., signal strength mapping), transmitter localization, audio streaming, or the like.

Aspects of the present invention provide a technical solution to the technical problem of coordinating the use of scattered, unrelated, and independent radio receivers. For example, aspects of the present invention include a system and/or method to provide consolidated host computing device information (e.g., via a blockchain) which identifies radio receivers associated with a single transmitter that can be contracted and used for a particular application (e.g., localizing a transmitter, identifying received signal strengths of the transmitter at various geographic locations, streaming audio from a radio station, etc.). Further, aspects of the present invention provide a technical solution to the technical problem of producing a signal strength map. For example, aspects of the present invention include a system and/or method to receive signal strength information from various unrelated radio receivers in a geographic area, and associate the signal strength information with geographic location information from which a signal strength map can be generated. Further, aspects of the present invention provide a technical solution to the technical problem of localizing a transmitter. For example, aspects of the present invention include a system and/or method to receive signal information from various unrelated radio receivers, and use the received signal information to identify the location of a transmitter using triangulation techniques. Further, aspects of the present invention provide a technical solution to the technical problem of receiving audio radio signals from a transmitter (e.g., radio station) that is outside of its communications range. For example, aspects of the present invention include a system and/or method to receive audio radio signals, and stream the audio to a region outside of the communications range.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
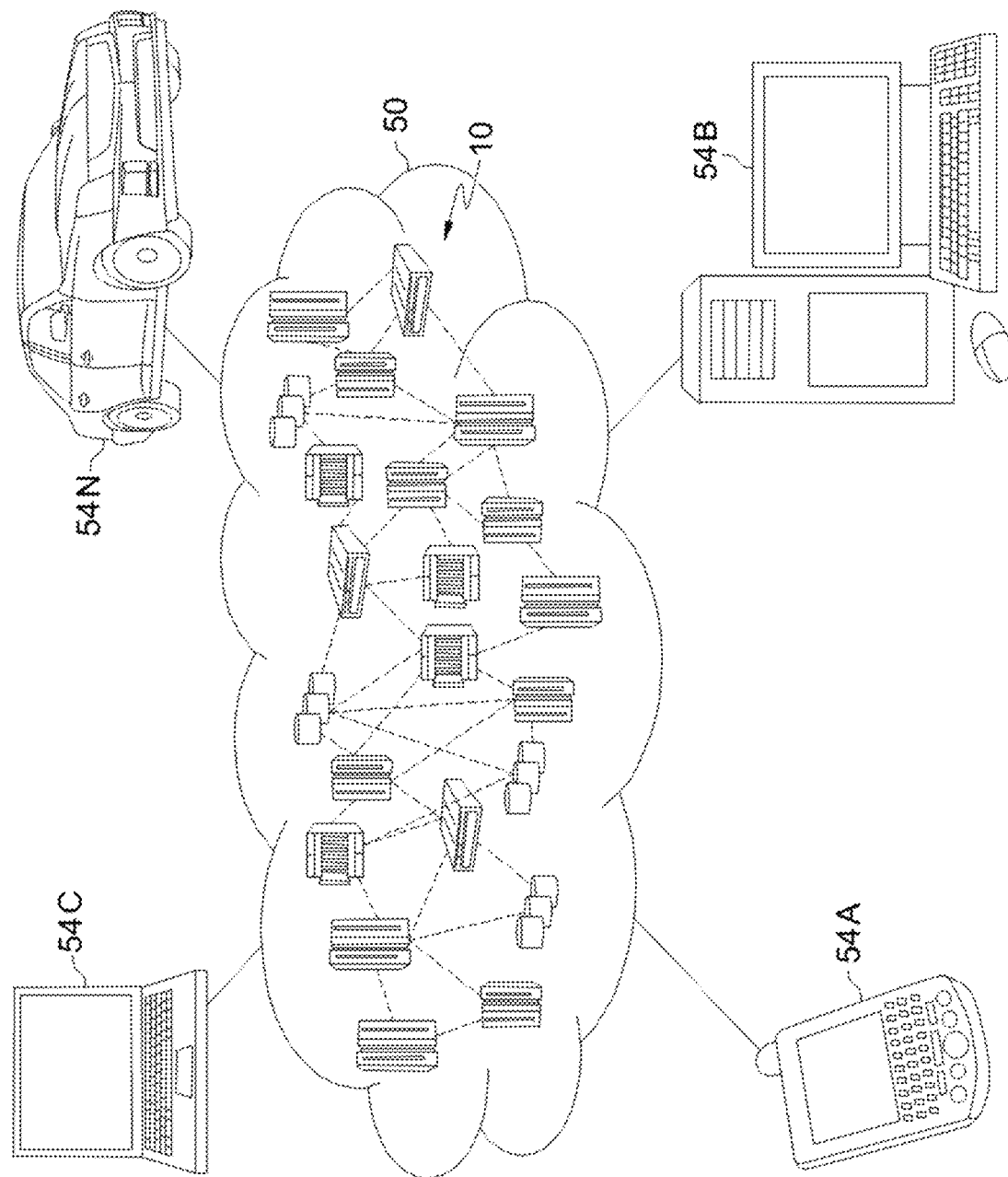
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
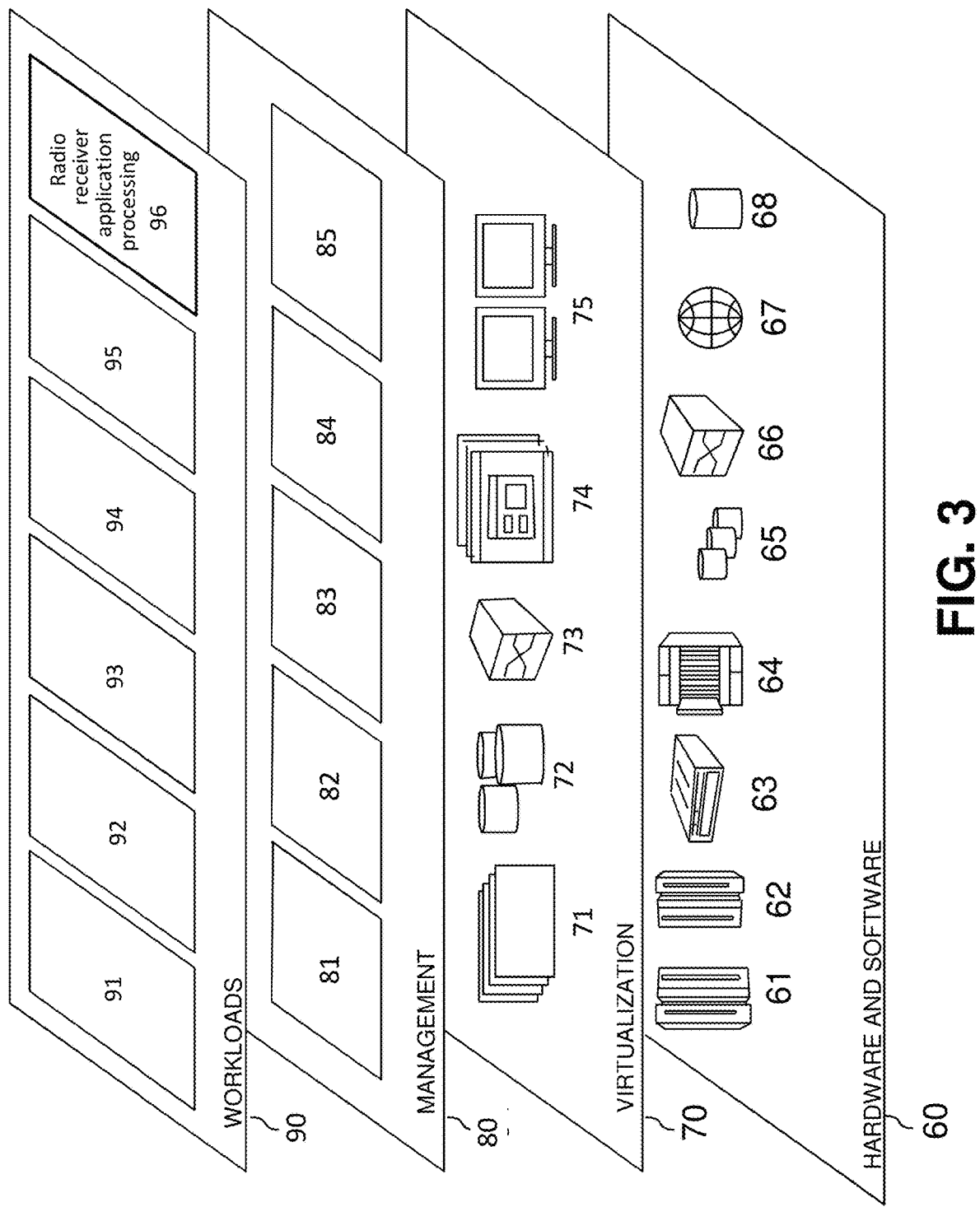
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and radio receiver application processing 96.

Referring back to FIG. 1, the Program/utility 40 may include one or more program modules 42 that generally carry out the functions and/or methodologies of embodiments of the invention as described herein including functionality of the radio receiver application processing 96 of FIG. 3. Specifically, the program modules 42 may discover host computing devices, provide proposals to use radio receivers on the host computing devices, and receive application data related to an application that uses the radio receivers of the host computing devices. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a client device and/or a host computing device as shown in FIG. 4.

Figure 4:
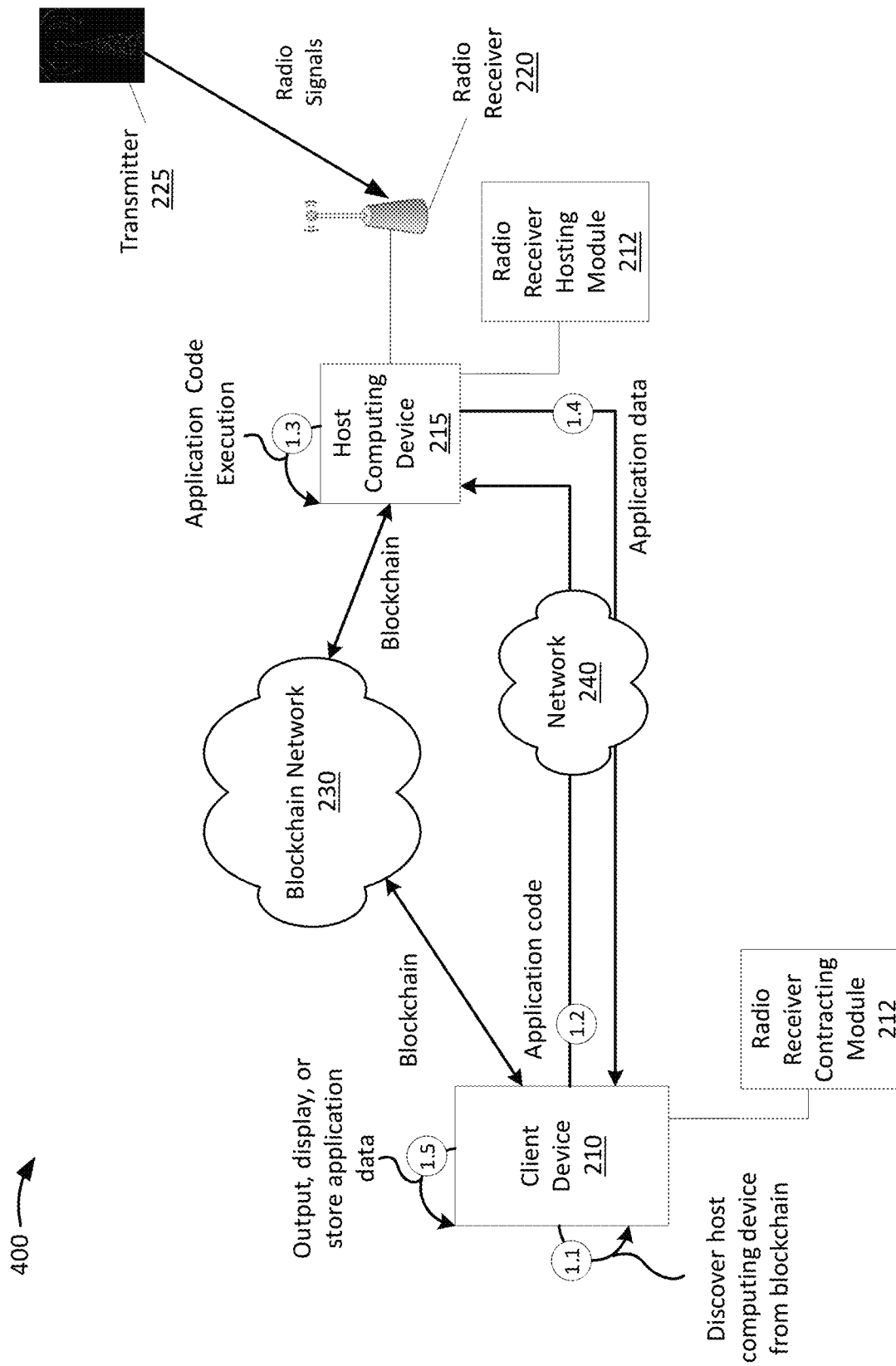
FIGS. 4 and 5 show overviews of example implementations in accordance with aspects of the present invention.
Figure 5:
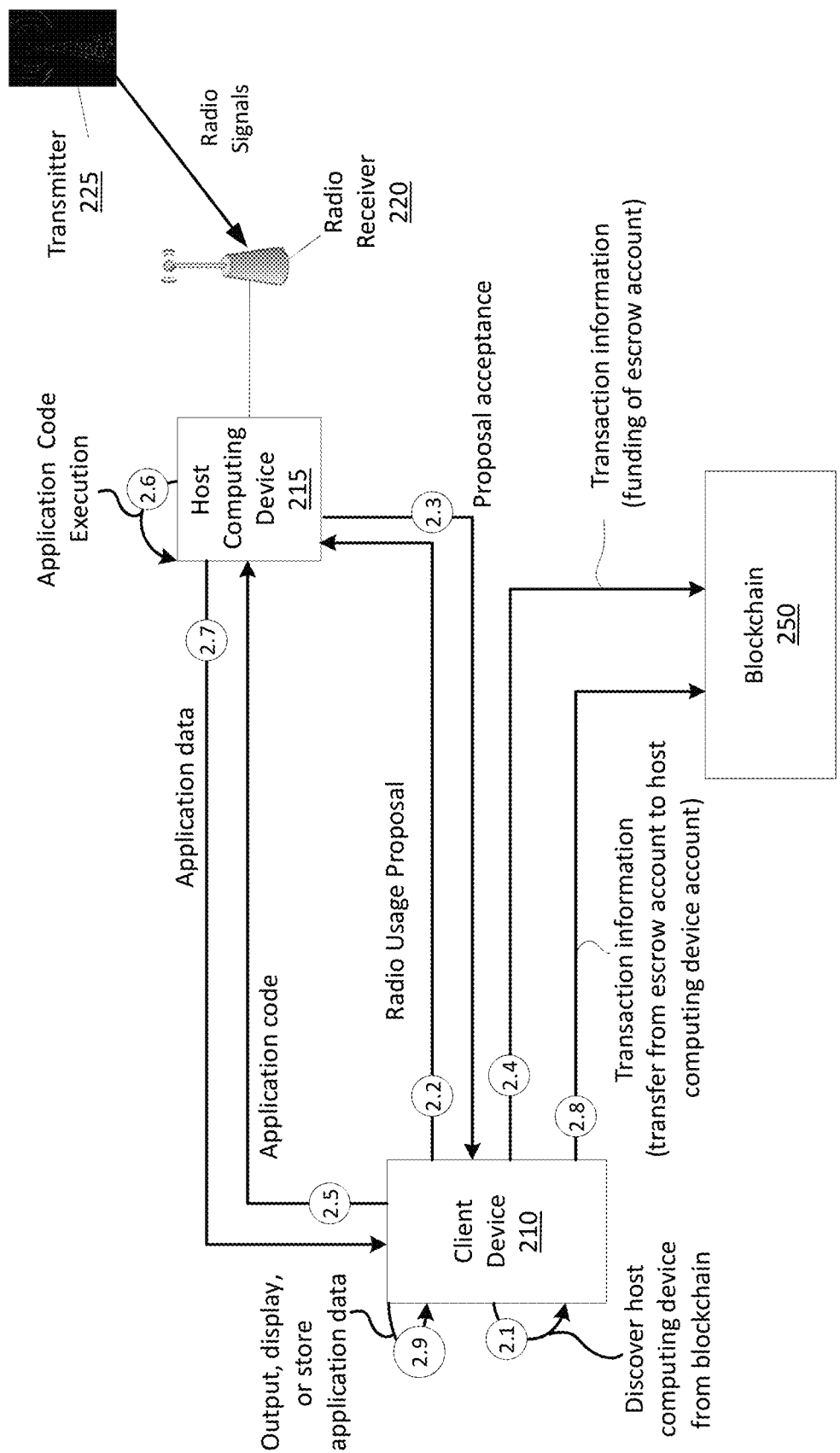

FIGS. 4 and 5 show an overview of an example implementation in accordance with aspects of the present invention. As shown in FIG. 4, environment 400 may include a client device 210, a host computing device 215, a radio receiver 220, a transmitter 225, a blockchain network 230, and a network 240. Client device 210 and host computing device 215 may include one or more of the components of computing system/server 12 of FIG. 1, such as one or more program modules 42. Further, client device 210 may include a radio receiver contracting module 212, which may include one or more program modules 42 that perform one or more functions of the client device 210 as described below. In embodiments, the host computing device 215 may include a radio receiver hosting module 218, which may include one or more program modules 42 that perform one or more functions of the host computing device 215 as described below.

As shown in FIG. 4, the host computing device 215 may implement a radio receiver 220 that receives radio signals from a single transmitter 225. The client device 210 and the host computing device 215 may communicate with a blockchain network 230. The blockchain network 230 may include a peer-to-peer network via which a blockchain (e.g., a shared database) is exchanged and synchronized between participants of the blockchain network 230. For example, the participants of the blockchain network 230 may include any type of computing device that is capable of communicating via a computing network. In the example of FIG. 4, the client device 210 and the host computing device 215 may be participants of the blockchain network 230, and thus, the client device 210 and the host computing device 215 may each store or access the same blockchain. As described herein, the blockchain may include host computing device participation information in which host computing devices that are available for contracting are identified in the blockchain.

At step 1.1, the client device 210 may discover the host computing device 215 from the blockchain. For example, the client device 210 may filter the blockchain to identify host computing devices that meet particular criteria (e.g., contracting/pricing criteria, application compatibility criteria, radio operating frequency criteria, geographic location criteria, an identifier of a transmitter from which radio signals are received, etc.). In embodiments, the client device 210 may filter the blockchain based on real-time user input of filtering criteria. Additionally, or alternatively, the client device 210 may automatically filter the blockchain based on preconfigured criteria (e.g., each time radio receiver services are needed from a host computing device).

At step 1.2, the client device 210 may provide an application code for execution on the host computing device 215. For example, the client device 210 may provide the application code via a network 240 (e.g., an external network such as the Internet, a virtual private network (VPN), cellular network, etc.). Alternatively, the client device 210 may provide an instruction for the host computing device 215 to obtain the application code from another source. As described herein, the application code includes instructions for the host computing device 215 to process and/or provide data relating to radio signals received by its radio receiver 220 from the transmitter 225. For example, the application code may relate to a signal strength mapping application, a transmitter localization application, a radio audio streaming application, etc. In embodiments, the host computing device 215 may receive the application code, and may validate and/or authenticate the application code (e.g., to ensure that the application code is received from an authorized device and does not include malicious and/or hazardous code). For example, the host computing device 215 may authenticate the code using any combination of authentication, encryption, decryption, and/or other techniques. As an example, a third-party cryptographic signing authority and/or service may be used to verify that a signature of the application code is associated the client device 210.

After receiving and authenticating the application code, at step 1.3, the host computing device 215 may execute the application code, and at step 1.4 the host computing device 215 may provide application data to the client device 210. The application data may include data relating to the executed application. As an example, the host computing device 215 may execute the application code to provide the client device 210 with application data including information identifying the signal strength of a received signal at the geographic location of the host computing device 215. For example, the host computing device 215 may execute the application code to tune the radio receiver 220 to a particular frequency at which the transmitter 225 is transmitting, receive the radio signals transmitted by the transmitter 225, and provide the application data. The client device 210 may use the application data to generate a signal strength map (e.g., by consolidating signal strength information and geographic location information from multiple different host computing devices 215 at different geographic locations). In embodiments, the client device 210 may use the application data from multiple different host computing devices 215 to geographically locate the transmitter 225 using triangulation techniques (e.g., for a "rogue" transmitter that may be transmitting radio signals via an unauthorized frequency). In this way, information from independent and unrelated radio receivers that each reactive radio signals from a single transmitter can be coordinated in a simple and effective manner.

In embodiments, the client device 210 may store, output, or display the application data (step 1.5). For example, the client device 210 may display the application data in the form of a map (e.g., a signal strength map), a chart, a graph, or other format. In embodiments, the application data may include audio data which may be output via a speaker of the client device 210 (e.g., for a radio audio streaming application). In embodiments, the client device 210 may output the application data to another device. For example, the client device 210 may be a cloud server that may store the application data for access by an external device.

Referring to FIG. 5, information from a blockchain 250 may be used to facilitate a financial transaction in connection with contracting the host computing device 215 for use of the radio receiver 220. For example, at step 2.1, the client device 210 may discover the host computing device 215 (e.g., in a similar manner as described above with respect to step 1.1 of FIG. 4). At step 2.2 the client device 210 may output a radio usage proposal that identifies the terms under which host computing device 215 may be contracted for use of the radio receiver 220. For example, the radio usage proposal may identify the application to be executed, the length of service, the type of service, pricing information, etc. At step 2.3, the host computing device 215 may provide an acceptance of the proposal thereby establishing a contracting relationship between the client device 210 and the host computing device 215. For example, the contracting relationship may be established by establishing a peer-to-peer connection between the client device 210 and the host computing device 215. At step 2.4, the client device 210 may write transaction information to the blockchain 250 that effectuates a transfer of funds from an account of the client device 210 to an escrow account (e.g., a trusted escrow account between parties associated with the client device 210 and the host computing device 215). In embodiments, the client device 210 may write transaction information to the blockchain 250 via a mining service.

At step 2.5, the client device 210 may provide the application code to the host computing device 215, and the host computing device 215 may execute the application code (at step 2.6) and provide application data (at step 2.7) to the client device 210 (e.g., in a similar manner as is discussed above with respect to steps 1.2, 1.3, and 1.4 of FIG. 4). At step 2.8, the client device 210 may write transaction information to the blockchain 250 (e.g., when the client device 210 receives the application data from the host computing device 215), that effectuates a transfer of funds from the escrow account to an account of the host computing device 215. At step 2.9, the client device 210 may store, display, or output the application data (e.g., in a similar manner as described above with respect to step 1.5 of FIG. 4).

As described above, independent and unrelated host computing devices 215 each implementing independent and unrelated radio receivers 220 may provide information indicating their respective availabilities to be contracted with and/or used for various applications. As described herein, a client device 210 may contract with one or more host computing devices 215 in order utilize the radio receivers 220 of the host computing devices 215. In embodiments, a contracted host computing devices 215 may obtain and execute an application or code container in order to provide the client device 210 with a service relating to the use of the radio receiver 220.

As an example, contracted host computing devices 215 may execute an application which directs the contracted host computing devices 215 to output information regarding respective signal strengths for received signals transmitted by a particular transmitter within a particular geographic area. The client device 210 may use the signal strength information to generate a signal strength map identifying the signal strength of a received transmitter signal at various geographic locations within the geographic area. As another example, the client device 210 may use signal strength information from various radio receivers 220 to triangulate and locate the source of a particular transmitter (e.g., a "rogue" transmitter that is transmitting signals on an unauthorized frequency). As another example, a contracted host computing devices 215 may execute an application that directs the host computing devices 215 to provide audio from a single transmitter (e.g., a radio station) to the client device 210. The client device 210 may itself play the audio, or stream the audio to another device. In this way, the client device 210 may play the audio or stream the audio from a radio station outside of communications range.

As described herein, a blockchain, peer-to-peer network, and/or similar technique may be used to provide host computing devices 215 information (e.g., information identifying the availability of host computing devices 215 and their respective radio receivers 220 to be contracted). That is, the providing of host computing devices 215 information may be decentralized, and the blockchain may be a decentralized shared database of host computing devices 215 information. The host computing devices 215 information may identify the types of radio receivers 220 implemented by the host computing devices 215, operating frequencies of the radio receivers 220, applications that the host computing devices 215 may implement, etc. A client device 210 may discover a host computing device 215 from the blockchain, and may filter the blockchain to identify host computing devices 215 that meet certain criteria based on a desired application. For example, if the client device 210 is to be used to identify received signal strengths from a particular transmitter within a particular geographic area, the blockchain may be searched and/or filtered to identify host computing devices 215 that implement radio receivers 220 within the particular geographic area and receive signals from a particular transmitter. Further, the host computing devices 215 information may identify pricing terms, service level agreements, and/or other contracting terms. The client device 210 may be used to filter host computing devices 215 based on the contracting terms.

As described herein, a blockchain may be used to facilitate the financial transaction between the client device 210 and the host computing devices 215 in connection with the client device 210 contracting with the host computing devices 215 for use of the radio receiver 220. For example, the client device 210 may provide a proposal to the host computing devices 215. In embodiments, a user of the client device 210 may provide user input via a user interface to select and provide proposals to host computing devices 215. Alternatively, proposals may be sent without user interaction (e.g., based on an automated technique in which the client device 210 automatically contracts with host computing devices 215 to execute an application. The proposal may include an offer to contract the host computing devices 215 to execute an application based on radio signals received by the radio receiver 220 (e.g., a signal strength application, a transmitter location triangulation application, a radio audio playback application, etc.). The proposal may include a price for contracting the host computing devices 215, and/or other contracting terms.

In embodiments, the host computing devices 215 may receive and accept the proposal. For example, the host computing devices 215 may automatically accept the proposal if the proposal adheres to preconfigured policies (e.g., pricing policies, usage policies, etc.). Alternatively, a user of the host computing devices 215 may receive the proposal via a user interface of the host computing devices 215, and may provide user feedback to accept the proposal. When a proposal is accepted, the client device 210 may write transaction information to the blockchain that effectuates a transfer of funds from an account of the client device 210 to an escrow account. The host computing devices 215 may then provide the contracted service to the client device 210 (e.g., by executing an application or code for the client device 210). The client device 210 may write transaction information to the blockchain (e.g., when the client device 210 receives the application data from the host computing device 215). Advantageously, the use of scattered, unrelated, and independent radio receivers 220 can be coordinated for various applications, such as radio spectrum analysis (e.g., signal strength mapping), transmitter localization, audio streaming, or the like.

The quantity of devices and/or networks in the environments of FIGS. 4 and 5 is not limited to what is shown in FIGS. 4 and 5. In practice, the environments may include additional devices and/or networks; fewer devices and/or networks; different devices and/or networks; or differently arranged devices and/or networks than illustrated in FIGS. 4 and 5. Also, in some implementations, one or more of the devices of the environments may perform one or more functions described as being performed by another one or more of the devices of the environments. Devices of the environments may interconnect via wired connections, wireless connections, or a combination of wired and wireless connections.

Figure 6:
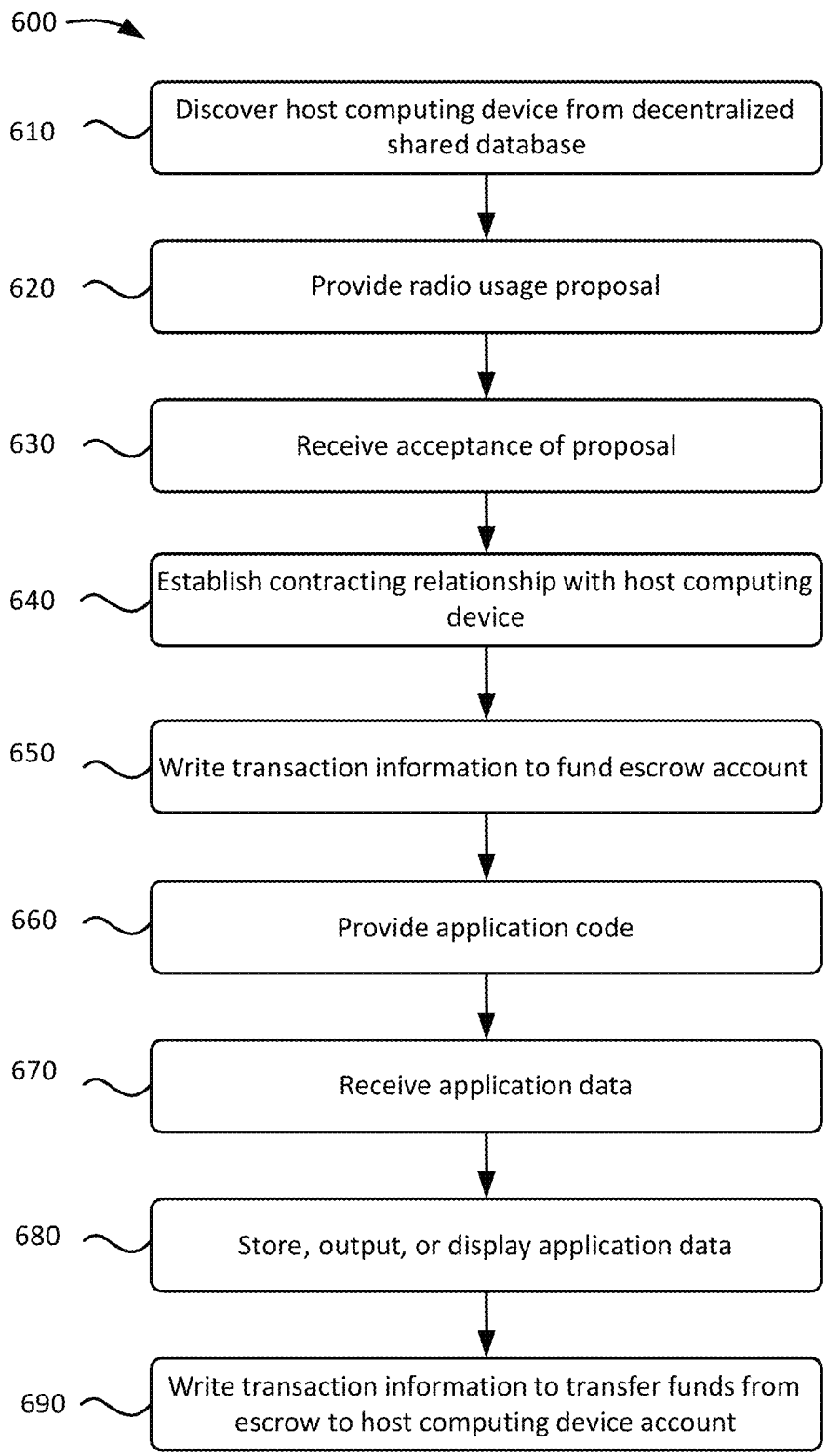
FIG. 6 shows an example flowchart for coordinating the use of a radio receiver implemented by a host computing device in accordance with aspects of the present invention.

FIG. 6 shows an example flowchart for coordinating the use of a radio receiver implemented by a host computing device in accordance with aspects of the present invention. The steps of FIG. 6 may be implemented in the environments of FIGS. 4 and 5, for example, and are described using reference numbers of elements depicted in FIGS. 4 and 5. As noted above, the flowchart illustrates the architecture, functionality, and operation of possible implementations of systems, methods, and computer program products according to various embodiments of the present invention.

As shown in FIG. 6, process 600 may include discovering a host computing device from a decentralized shared database (step 610). For example, the client device 210 may discover a host computing device 215 from a decentralized shared database, such as a blockchain (e.g., in a similar manner as described above with respect to step 1.1 and 2.1 of FIG. 4 and FIG. 5, respectively).

Process 600 may also include providing a radio usage proposal (step 620) and receiving acceptance of the proposal (step 630). For example, the client device 210 may provide a radio usage proposal and receive acceptance of the proposal (e.g., in a similar manner as described above with respect to step 2.2 and step 2.3 of FIG. 5). In embodiments, the radio usage proposal may include a request to access the host computing device 215 and a request to access data related to the radio signals received by the radio receiver 220 of the host computing device 215. The acceptance of the proposal may include an indication that the request to access has been granted.

Process 600 may also include establishing a contracting relationship with the host computing device 215 (step 640). For example, the client device 210 may establish a contracting relationship with the host computing device based on receiving the acceptance of the proposal (e.g., in a similar manner as described above with respect to step 2.2 and step 2.3 of FIG. 5).

Process 600 may further include writing transaction information to fund an escrow account (step 650). For example, the client device 210 may write transaction information to the blockchain 250 to fund the escrow account (e.g., in a similar manner as described above with respect to step 2.4 of FIG. 5). Process 600 may also include providing application code (step 660). For example, the client device 210 may provide the application code to the host computing device 215 (e.g., in a similar manner as described above with respect to step 1.2 and step 2.5 of FIGS. 4 and 5, respectively).

Process 600 may further include receiving application data (step 670). For example, the client device 210 may receive the application data from the host computing device 215 (e.g., as described above with respect to steps 1.4 and 2.7 of FIGS. 4 and 5, respectively). Process 600 may also include storing, outputting, or displaying the application data (step 680). For example, the client device 210 may store, output, or display the application data (e.g., in a similar manner described above with respect to steps 1.5 and 2.10 of FIGS. 4 and 5, respectively). Process 600 may further include writing transaction information to transfer funds from the escrow account to the house computing device account (step 690). For example, the client device 210 may write the transaction information to the blockchain 250 to effectuate a transfer of funds from the escrow account to the house computing device account (e.g., in a similar manner described above with respect to step 2.8 of FIG. 5).

Figure 7:
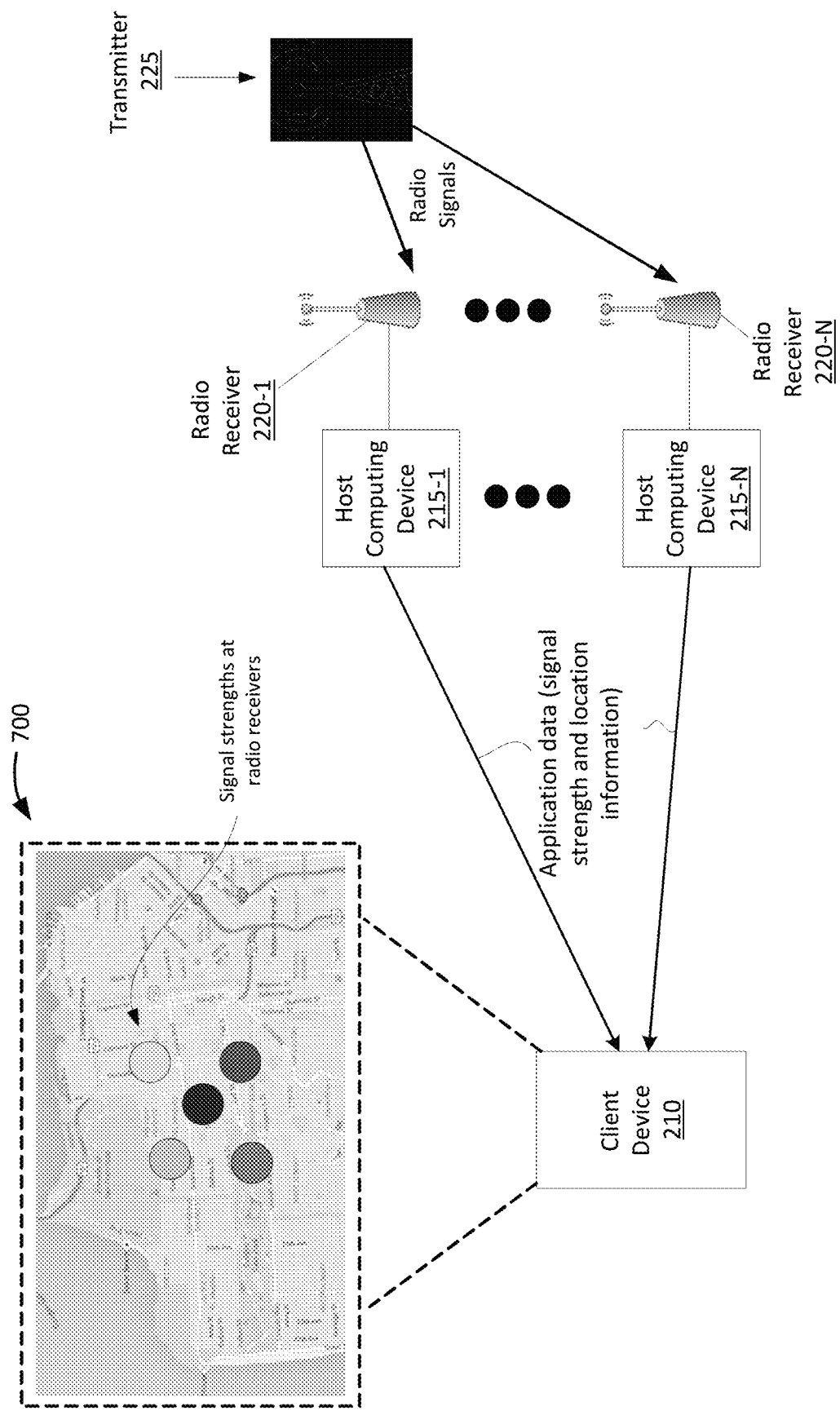
FIG. 7 shows an example implementation for coordinating the use of multiple unrelated radio receivers to generate a signal strength map in accordance with aspects of the present invention.

FIG. 7 shows an example implementation for coordinating the use of multiple unrelated radio receivers to generate a signal strength map in accordance with aspects of the present invention. As shown in FIG. 7, radio receivers 220-1 through 220-N (where N is greater than or equal to 1) may receive radio signals from a single transmitter (e.g. the transmitter 225). In the example of FIG. 7, the client device 210 has contracted with host computing devices 215-1 through 215-N for receiving signal strength information from host computing devices 215-1 through 215-N (e.g., based on the processes described herein). The host computing devices 215-1 through host computing device 215-N may provide application data to the client device 210 in which the application data includes signal strength information and location information for each of host computing devices 215-1 through host computing devices 215-N. The host computing device 215 may receive the application data, and may generate a signal strength map (as shown interface 700) that identifies the signal strengths for signals transmitted by the transmitter 225 and received by the host computing devices 215 at the locations of the host computing devices 215. In the example of FIG. 7, each circle on the map indicates the received signal strength by each radio receiver 220 at a particular geographic location. Each circle may be colored or shaded such that different colors and shaded represent different signal strengths (e.g., darker shades represent stronger signal strengths). In this way, a signal strength map can be generated using host computing devices 215 that are unrelated to each other. In embodiments, an owner or administrator of the transmitter 225 may use the signal strength map to identify geographic areas in which signal reception strength is relatively low. The signal strength map may be used to modify the transmitter 225 such that signal reception is improved in areas in which signal reception strength is relatively low. As described herein, the client device 210 may provide the application data to another device without itself displaying the signal strength map.

Figure 8:
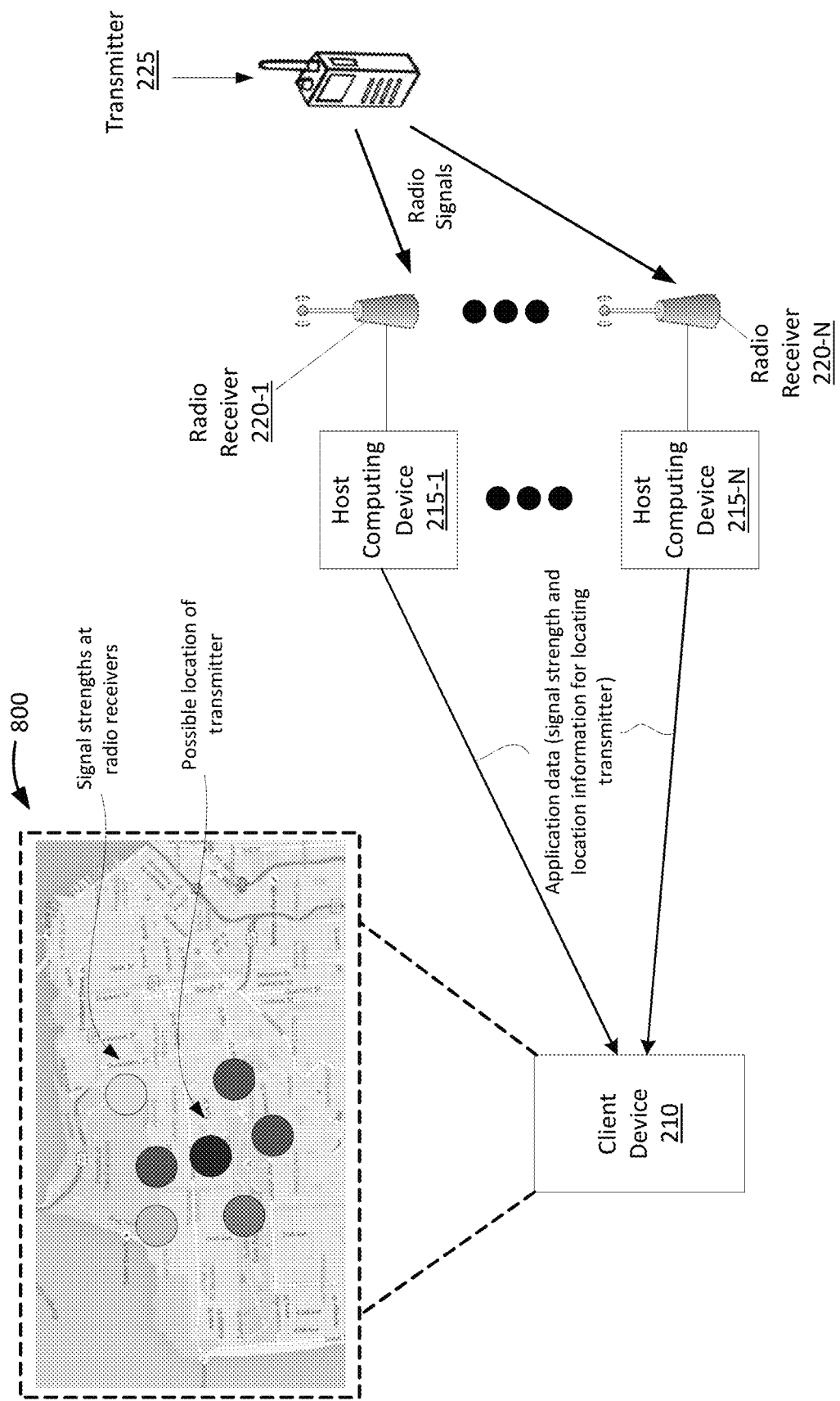
FIG. 8 shows an example implementation for coordinating the use of multiple unrelated radio receivers to determine a location of a transmitter in accordance with aspects of the present invention.

FIG. 8 shows an example implementation for coordinating the use of multiple unrelated radio receivers to determine a location of a transmitter in accordance with aspects of the present invention. As shown in FIG. 8, radio receivers 220-1 through 220-N (where N is greater than or equal to 1) may receive radio signals from a single transmitter (e.g. a portable transmitter 225 as opposed to a fixed transmitter as in the preceding examples). The client device 210 may contract with the host computing devices 215-1 through 215-N to receive information identifying the signal reception strength at various geographic locations for signals received from the transmitter 225. In a similar manner as described above in FIG. 7, the host computing devices 215-1 through 215-N may provide application data to the client device 210 in which the application data includes information identifying the signal reception strength at various geographic locations. The client device 210 may use the application data to generate a signal strength map and may further identify a possible location of the transmitter 225 using triangulation techniques. In embodiments, the client device 210 may display the signal strength map and the possible location. Additionally, or alternatively, the client device 210 may provide the application data to another device so that the other device may be used to display the signal strength map and/or possible location of the transmitter 225.

Figure 9:
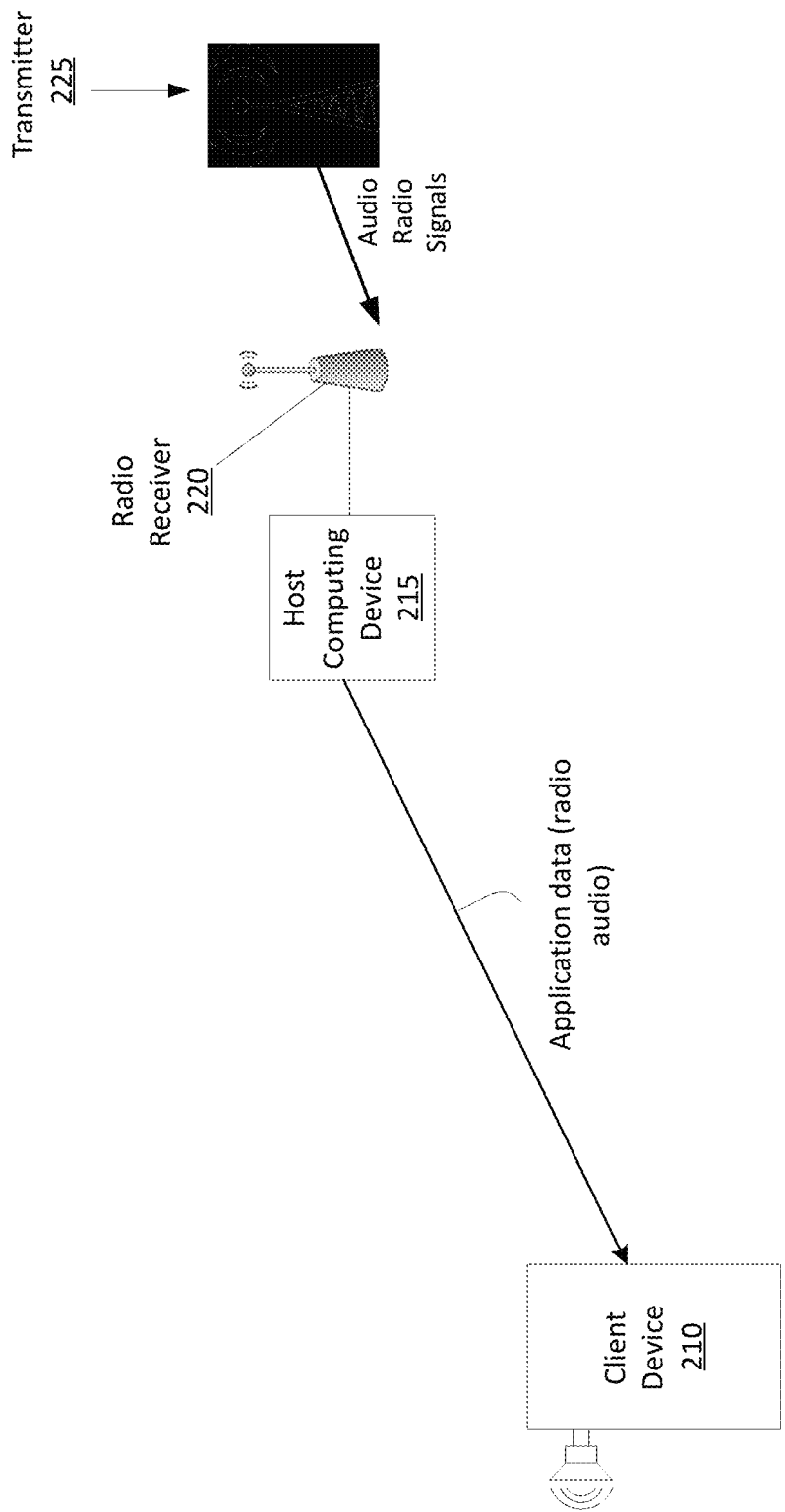
FIG. 9 shows an example implementation for accessing an independent radio receiver by a client device for receiving radio audio from a transmitter outside of communications range of the client device in accordance with aspects of the present invention.

FIG. 9 shows an example implementation for accessing an independent radio receiver by a client device for receiving radio audio from a transmitter outside of communications range of the client device in accordance with aspects of the present invention. As shown in FIG. 9, radio receiver 220 may receive audio radio signals from a transmitter 225 (e.g., a radio station). In the example illustrated in FIG. 9, the client device 210 has contracted with host computing device 215 for receiving radio audio from the host computing device 215 (e.g., based on the processes described herein). The host computing device 215 may provide the radio audio to the client device 210, and the client device 210 may output the radio audio through a speaker of the client device 210. In embodiments, the application code, associated with the client device 210, may cause the host computing device 215 to convert the radio audio into a format that can be streamed to the client device 210 via an IP network. In embodiments, the client device 210 may provide the radio audio to another device without the client device 210 itself outputting the radio audio.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   discovering, by a client device, an available host computing device implementing a radio receiver from a decentralized shared database;
   establishing, by the client device, a relationship with the host computing device based on discovering the host computing device from the decentralized shared database;
   receiving, by the client device, application data from the host computing device based on establishing the relationship, wherein:
      the application data is associated with radio signals transmitted by only a single transmitter and received by the radio receiver of the host computing device,
      the client device is detached from the single transmitter, and
      the single transmitter is separate from the host computing device;
   providing the host computing device with information regarding an application code for execution on the host computing device, wherein receiving the application data from the host computing device is based on providing the information regarding the application code; and
   storing, outputting, or displaying, by the client device, the application data,
   wherein the application data identifies a signal reception strength of a radio signal received by the radio receiver from the single transmitter and a geographic location of the host computing device, and
   execution of the application code causes the host computing device to: set a reception frequency of the radio receiver to a transmission frequency of the single transmitter; receive radio signals from the transmitter; and provide the application data to the client device.

2. The computer-implemented method of claim 1, further comprising generating a signal strength map based on the application data.

3. The computer-implemented method of claim 2, further comprising:
   identifying an approximate location of the single transmitter based on the application data; and
   displaying the approximate location of the single transmitter on the signal strength map.

4. The computer-implemented method of claim 1, wherein the application data includes radio audio, the computer-implemented method further comprising outputting the radio audio.

5. A computer program product for coordinating the use of independent and unrelated radio receivers, the computer program product comprising a computer readable storage medium having program instructions embodied therewith, the program instructions executable by a client device to cause the client device to:
   identify, from a decentralized shared database, an available host computing device implementing a radio receiver receiving radio signals from only a single transmitter;
   provide a request to access the identified host computing device;
   receive an indication of acceptance of the request;
   provide information regarding an application code to the host computing device for execution on the host computing device based on receiving the indication of acceptance;
   receive radio related data from the host computing device based on providing the information regarding the application code to the host computing device, wherein the radio related data is associated with the radio signals received by the radio receiver from the single transmitter;
   generate a signal strength map based on the radio related data; and
   store, output, or display the radio related data,
   wherein the client device is detached from the single transmitter;
   the single transmitter is separate from the host computing device;
   the radio related data identifies a signal reception strength of a radio signal received by the radio receiver from the single transmitter and a geographic location of the host computing device; and
   execution of the application code causes the host computing device to: set a reception frequency of the radio receiver to a transmission frequency of the single transmitter, receive radio signals from the single transmitter, and provide the radio related data to the client device.

6. The computer program product of claim 5, wherein the program instructions cause the client device to:
   identify an approximate location of the single transmitter based on the application data; and
   display the approximate location of the single transmitter on the signal strength map.

7. The computer program product of claim 5, wherein the application data includes radio audio, and the program instructions cause the client device to output the radio audio.

8. A system comprising:
   a CPU, a computer readable memory, a computer readable storage medium associated with a client device, and program instructions stored on the computer readable storage medium, the program instructions executable by the CPU to:
   identify, from a decentralized shared database, an available host computing device implementing a radio receiver receiving radio signals from only a single transmitter;
   provide a request to access the identified host computing device;
   receive an indication of acceptance of the request;
   provide information regarding an application code to the host computing device for execution on the host computing device based on receiving the indication of acceptance;
   receive radio related data from the host computing device based on providing the information regarding the application code to the host computing device, wherein the radio related data is associated with the radio signals received by the radio receiver from the single transmitter;

generate a signal strength map based on the radio related data; and store, output, or display the radio related data, wherein the client device is detached from the single transmitter;

the single transmitter is separate from the host computing device;

the radio related data identifies a signal reception strength of a radio signal received by the radio receiver from the single transmitter and a geographic location of the host computing device; and the host computing device is configured to: set a reception frequency of the radio receiver to a transmission frequency of the single transmitter, receive radio signals from the single transmitter, and provide the radio related data to the client device.

9. The system of claim 8, wherein the program instructions are executable by the CPU to:

identify an approximate location of the single transmitter based on the application data; and display the approximate location of the single transmitter on the signal strength map.

10. The system of claim 8, wherein the application data includes radio audio, and the program instructions are executable by the CPU to output the radio audio.

* * * * *